United States Patent [19]

Sumiya et al.

[11] Patent Number: 4,753,132
[45] Date of Patent: Jun. 28, 1988

[54] HYDRAULIC SERVO FOR FRICTION COUPLING DEVICES OF AUTOMATIC TRANSMISSIONS

[75] Inventors: Koji Sumiya, Nishio; Koji Kobayashi, Toyota; Haruki Takemoto, Chiryu; Seitoku Kubo, Toyota; Yutaka Taga, Aichi; Kazuaki Watanabe, Toyota, all of Japan

[73] Assignees: Aisin-Warner Ltd.; Toyota Motor Corp., both of Japan

[21] Appl. No.: 728,668

[22] Filed: Apr. 29, 1985

[30] Foreign Application Priority Data

May 2, 1984 [JP] Japan .................................. 59-89075

[51] Int. Cl.$^4$ ............................................. F16H 57/10
[52] U.S. Cl. ...................................... 74/753; 192/87.1; 192/87.17
[58] Field of Search .................. 192/87.1, 87.11, 87.12, 192/87.13, 87.14, 87.15, 87.16, 87.17, 87.18, 87.19; 74/753

[56] References Cited

U.S. PATENT DOCUMENTS

| | | | |
|---|---|---|---|
| 2,632,544 | 3/1953 | Hockert | 192/87.18 X |
| 2,804,780 | 9/1957 | Gerst | 74/360 |
| 2,868,341 | 1/1959 | Snoy | 192/87.18 X |
| 3,017,006 | 1/1962 | Dence et al. | 192/87.15 X |
| 3,265,175 | 8/1966 | Croswhite | 192/87.13 |
| 3,602,055 | 8/1971 | Hause et al. | 74/753 X |
| 3,858,460 | 1/1975 | Porter et al. | 74/753 |
| 3,913,616 | 10/1975 | Horsch | 192/87.1 X |
| 3,938,631 | 2/1976 | Smith | 192/87.12 X |
| 4,134,483 | 1/1979 | Horsch | 192/87.17 X |
| 4,237,749 | 12/1980 | Koivunen | 192/87.11 X |
| 4,573,560 | 3/1986 | Eguchi | 192/87.1 |
| 4,607,541 | 8/1986 | Miura et al. | 74/758 |

FOREIGN PATENT DOCUMENTS

| | | | |
|---|---|---|---|
| 15150 | 1/1982 | Japan | 74/753 |
| 195962 | 12/1982 | Japan | 74/753 |
| 602399 | 3/1978 | U.S.S.R. | 192/85 AA |

Primary Examiner—Leslie A. Braun
Assistant Examiner—Dwight G. Diehl
Attorney, Agent, or Firm—Lorusso & Loud

[57] ABSTRACT

A hydraulic servo for friction coupling devices of automatic transmissions, the hydraulic servo comprising: an annular drum including outer and inner cylinders and a side wall connecting the two cylinders together and mounted fixedly or rotatably within an automatic transmission case; an intermediate cylinder mounted concentrically in a predetermined position between the outer and inner cylinders of the drum; a return biasing means located between the intermediate and inner cylinders; and a connecting member securely connecting the return biasing means to a piston.

3 Claims, 9 Drawing Sheets

HYDRAULIC SERVO FOR FRICTION COUPLING DEVICES OF AUTOMATIC TRANSMISSIONS

BACKGROUND OF THE INVENTION (i) Field of the Invention:

This invention relates to a hydraulic servo for a friction coupling device of automatic transmission.

(ii) Description of the Prior Art:

Heretofore, hydraulic servos for friction coupling devices or elements of automatic transmission have usually included an annular drum having an outer cyliner, an inner cylinder and a side wall connecting the two cylinders together, a piston fitted between the outer and inner cylinders of the drum, and return springs mounted on the outer side of the outer cylinder or on a wall portion of the piston, and adapted to engage a friction coupling device upon supplying a line pressure between the drum and piston and to release the friction coupling device upon draining the line pressure. In a case where return springs are located in positions outward of the outer cylinder, however, the radial dimensions of the hydraulic servo of the friction coupling device become unduly large. On the other hand, when the return springs are mounted on a wall portion of the piston, the hydraulic servo of the friction coupling device has undesirably large dimensions in the axial direction. Further, when upshifting a vehicular automatic transmission, for example, from first to second speed, a friction brake B2 which holds the outer race F2 of a one-way clutch stationary in the engaged state is fixed to the autmatic transmission case. However, a hydraulic servo B-2 which operates to engage and release the brake B2 usually consists of a hydraulic drum and a piston with return springs, and has a large piston mounting area due to the existence of a broad space between the outer and inner cylinders of the hydraulic drum. Therefore, there is no space for mounting the return springs unless the case is extended to provide extra space for mounting the return springs. In addition, owing to the large dimensions of the piston, shift shocks occur at the time of upshift from first to second speed.

SUMMARY OF THE INVENTION

It is an object of the present invention to provide a hydraulic servo for a friction coupling device of an automatic transmission, which employs an optimum area for the piston of the friction coupling device for suppression of shift shocks and which allows for mounting a piston return biasing means in the remaining space, thereby permitting construction of a compact hydraulic servo for the friction coupling element without increasing the radial or axial dimensions of the mounting space required for the hydraulic servo of the friction coupling device.

According to the invention, there is provided a hydraulic servo for a friction coupling device of an automatic transmission, the hydraulic servo comprising: an annular drum including outer and inner cylinders (may be referred to as the first and second cylinders, respectively) and a side wall connecting the two cylinders together and mounted fixably or rotatably within an automatic transmission case; an intermediate cylinder (may be referred to as the third cylinder) mounted concentrically in a predetermined position in the drum; a return biasing means provided between the intermediate and inner cylinders; and a connecting member connecting the return biasing means securely to a piston.

The hydraulic servo for a friction coupling device of automatic transmission according to the invention has the following effects and advantages.

(a) Since the friction coupling device has an optimum piston area for suppression of shocks at the time of shifts to second speed and the return biasing means for the piston is accommodated in a saved space, it becomes possible to manufacture a hydraulic servo of compact construction for a friction coupling element without extending the mounting space of the hydraulic servo in the radial or axial direction.

(b) The hydraulic servo can be used for other friction elements, so that it can be produced at low cost.

The above and other objects, features and advantages of the invention will become apparent from the following description and the appended claims, taken in conjunction with the accompanying drawings which show by way of example preferred embodiments of the invention.

DESCRIPTION OF PREFERRED EMBODIMENTS

Hereafter, the invention is described more particularly by way of preferred embodiments shown in the drawings.

Figure 1:
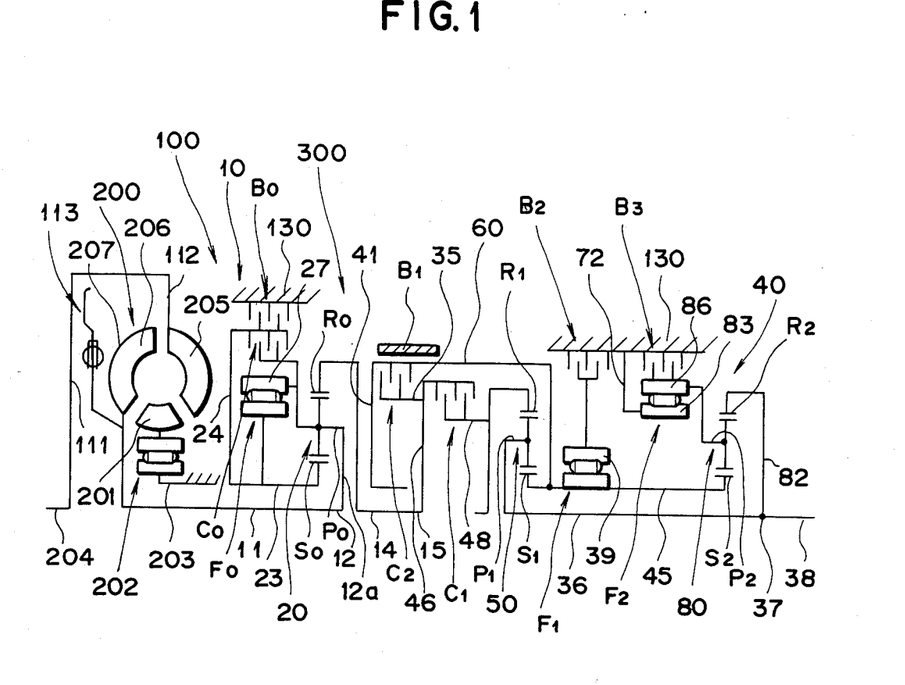
FIG. 1 is a skeletal view of a vehicular automatic transmission incorporating a hydraulic servo of the invention for a friction coupling device of the automatic transmission.
Figure 2:
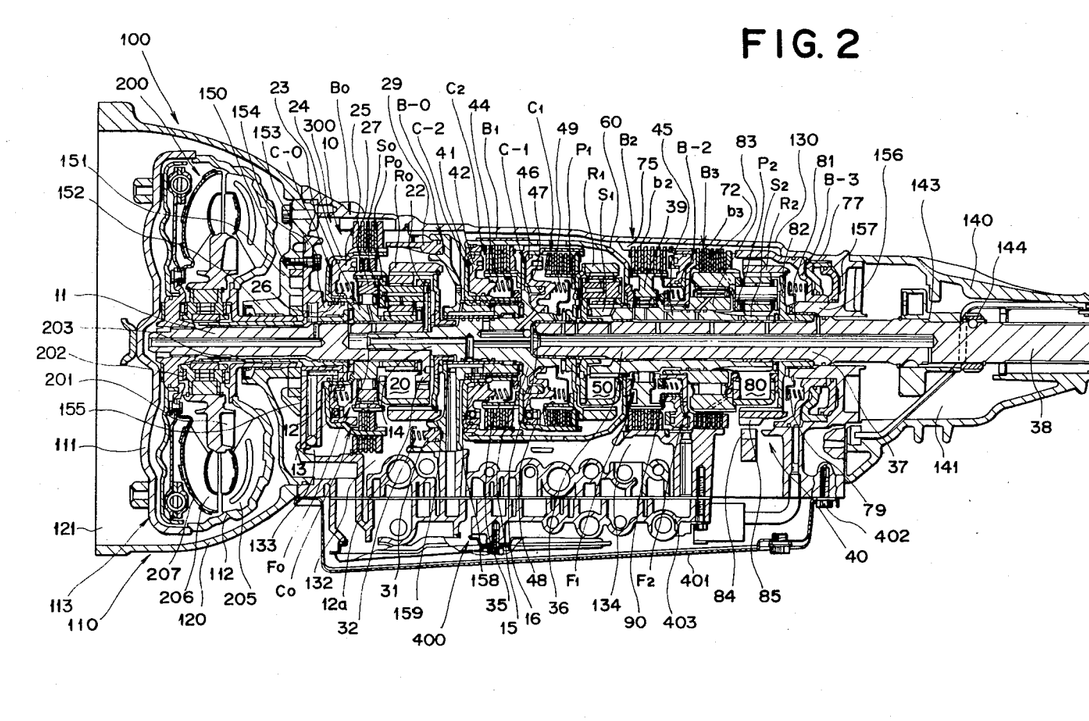
FIG. 2 is a sectional view of the vehicular automatic transmission shown in FIG. 1.
Figure 3:
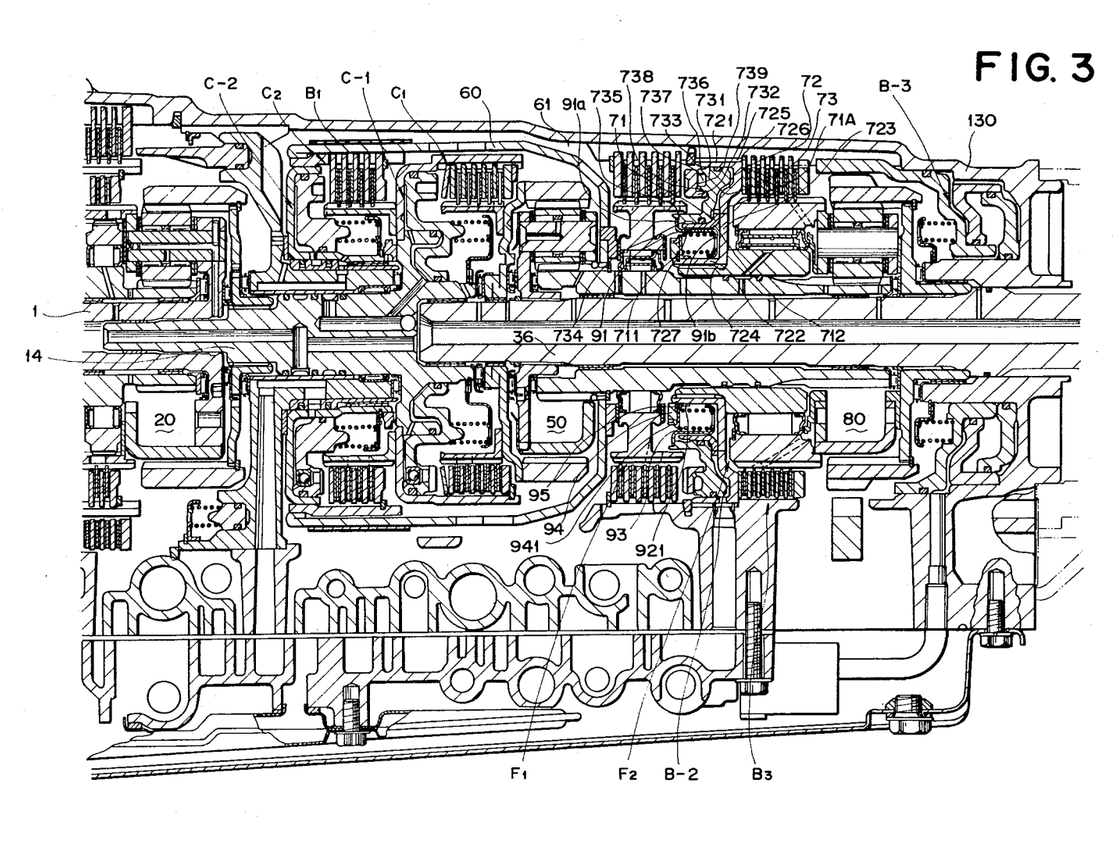
FIG. 3 is a sectional view showing major components of the automatic transmission.

Referring to FIGS. 1 to 3 which show a gear train of a vehicular automatic transmission which is generally indicated at 100 and includes a fluid type torque converter 200, a transmission gear system 300, and a hydraulic control system 400.

The transmission 300 is constituted by: an overdrive gear mechanism 20 including a first planetary gear set 10, a multidisk clutch C0 operated by a hydraulic servo, a multi-disk brake B0 and a one-way clutch F0; and an underdrive planetary gear transmission with three forward and one reverse speed ranges, including a second planetary gear set 50, a third planetary gear set 80, two multi-disk brakes C1 and C2 operated by hydraulic servos, a belt brake B1, two multi-disk brakes B2 and B3 and two one-way clutches F1 and F2.

The case 110 of the automatic transmission includes: a torque converter housing 120 encasing the torque converter 200; a transmission case 130 integrally forming compartments for accommodating the overdrive planetary gear transmission 10 and the underdrive planetary gear transmission 40; and an extension housing 140 closing the rear side of the automatic transmission 100. These torque converter housing 120, transmission case 120 and extension housing 140 are fastened together by a plural number of bolts.

The torque converter 200 is encased in a torque converter chamber 121 which is open on the front side (on the side of the engine), and includes: a front cover 111 coupled with the input shaft 204 (FIG. 1) of the torque converter, an annular rear cover 112 welded at peripheral edges to the front cover 111, a pump impeller 205 provided around the inner peripheral wall of the rear cover 112, a turbine runner 206 positioned opposingly to the pump impeller 205, a turbine shell 207 retaining the turbine runner 206, a stator 201 supported on a fixed shaft 203 through a one-way clutch 202, and a direct-coupling (lock-up) clutch 113 provided between the front cover 111 and turbine shell 207. Between the torque converter chamber 121 and a cylindrical transmission chamber 132 which is formed contiguously on the rear side of the torque converter chamber 121, a front oil pump cover 151 of an annular plate-like shape which is internally provided with a forwardly projecting cylindrical portion 152 is fastened to the transmission case 130. Fastened to the rear side of the front oil pump cover 151 is an oil pump cover 154 with a cylindrical front support 153 which is projected rearward in coaxial relation with the cylindrical portion 152, the front oil pump cover 151 and the oil pump cover 154 forming a partition wall 155 between the torque converter chamber 121 and transmission chamber 132. Provided in an intermediate position in the transmission chamber 132 is a center support 159 with a rearwardly projecting cylindrical support portion 158, partitioning the overdrive chamber 133 from the underdrive chamber 134. Provided in the rear portion is a rear support wall 157 with a forwardly projecting cylindrical rear support 156. The partition wall 155 and rear support wall 157 define the transmission chamber 132 therebetween, and the rear support wall 157 and extension housing 140 define therebetween an output shaft chamber 141 therebetween. The extension housing 140 accommodates therein an electronically controlled sensor rotor 143 and a speed meter drive gear 144, and, though not shown, has a sleeve yoke inserted thereinto in a forwardly facing position coaxially with a front support 153.

Fitted in the front support 153 is a fixed shaft 203 of the one-way clutch 202 which supports the stator 201 of the torque converter 200, and an input shaft 11 of the transmission, which also serves as the output shaft of the torque converter 200, is rotatably supported on the inner side of the fixed shaft 203. The input shaft 11 is formed in a larger diameter at a rear end portion 12 which is projected rearward from the front support 153 and provided with a flange portion 12a, and formed with a rearwardly facing opening hole 13 at the center of the rear end portion 12. On the rear side of the input shaft 11, an intermediate transmission shaft 14 is mounted rotatably in series with the input shaft 11, with its fore end slidably engaged in the hole 13. The intermediate shaft 14 has a rear end portion 15 of a larger diameter, which is provided with a rearwardly opening hole 16 in sliding engagement with the fore end of the output shaft 36. The output shaft 36 is splined at its intermediate portion 37 to a flange plate 82 with a rearwardly projecting shaft portion 81 in meshing engagement with a ring gear R2 of the third planetary gear set 80, and splined at its rear portion 38 to the afore-mentioned sleeve yoke, fixedly mounting the sensor rotor 143 and speed meter drive gear 144 within the output shaft chamber 141.

In the overdrive chamber 133, the first planetary gear set 20 is mounted on a rear portion of the input shaft 11, the planetary gear set 20 having a ring gear R0 coupled with the intermediate shaft 14 through the flange plate 22, a planetary gear P0 coupled with the flange portion1 12a of the input shaft 11, and a sun gear S0 formed on an inner race shaft 23. On the front side of the first planetary gear set 20, a rearwardly opened drum 24 of a first hydraulic servo is fixedly mounted on the inner race shaft 23, with an annular piston 25 fitted between its outer peripheral wall and the inner race shaft 23 to form a hydraulic servo C-1 for the clutch C0. Further, return springs 26 are mounted on the side of the inner race shaft 23, and the clutch C0 is mounted on the inner side of the outer peripheral wall to couple the drum 24 with the carrier P0 through the clutch C0. Provided on the inner periphery of the first hydraulic drum 24 is a one-way clutch F0 which utilizes the inner race shaft 23 as its inner race. On the outer periphery of the one-way clutch F0, the clutch C0 and brake B0 are provided between the outer race 27 and transmission case 130. A piston 29 is fitted on a front portion of the center support 159 on the rear side of the just-mentioned brake B0 to form a hydraulic servo B-0 therefor. Return springs 32 are fitted in the inner peripheral portion 31 of the center support 159 at the fore end thereof.

In the underdrive chamber 134, a rearwardly opened second hydraulic servo drum 41 is rotatably fitted on the center support 159 in a front portion of the chamber 134 to form a hydraulic servo C-2 for a clutch C2, with return springs 44 and clutch C2 mounted on the side of the inner peripheral wall and on the inner side of the outer peripheral wall of the drum, respectively. On the rear side of the second hydraulic servo drum 41, a rearwardly opened third hydraulic servo drum 46 with an annular projection 35 on the front side thereof is securely fixed to a rear end portion 15 of the intermediate transmission shaft 14, and an annular piston 47 is fitted between the rear end portion 15 and the outer peripheral wall to form a hydraulic servo C-1 for the clutch C1. Further, return springs 49 are mounted on the side of the inner periphery of the drum, and clutch C2 is mounted on the outer periphery of the annular projection 35 to couple the second and third hydraulic servo drums 41 and 46 through the clutch C2. Provided on the rear side of the third hydraulic servo drum 46 is the second planetary gear set 50, which has a ring gear R1 coupled with the third hydraulic servo drum 46 through the annular projection 48 and clutch C1, a carrier P1 splined to the fore end portion of the output shaft 36 and a sun gear S1 integrally formed with a sun gear shaft 45. A connecting drum 60 which is so shaped as to cover the second and third servo drums 41 and 46 and the second planetary gear set 50 in a minimum space is secured at its fore end to the outer periphery of the second servo drum 41 and coupled at its rear end with the sun gear shaft 45 on the rear side of the second planetary gear set 50, and a belt brake B1 is mounted on the outer peripheral side.

Spline 75 which is formed on the inner side of the transmission case 130 rearward of the brake B2 is engaged from front side thereof with brake disks b2 and b3 of the brakes B2 and B3, and a piston 77 is fitted in an annular hole between the outer periphery of a rear support 156 of a rear support wall 157 behind the spline 75 and the transmission case 130 to form a hydraulic servo B-3 for the brake B3. Return springs 79 for the hydraulic servo B-3 are supported by a flange plate 82 which is mounted on the fore end of the rear support 156. Provided on the inner side of the brake B2 is a one-way clutch F1 which utilizes the sun gear shaft 45 as its inner race, having an outer race 39 connected to the brake B2. Mounted on the rear side of the one-way clutch F1 is a return biasing means 90 and a one-way clutch F2 having its inner race 83 splined on the outer side thereof to the inner periphery of the fourth hydraulic servo drum 72. The third planetary gear set 80 includes a sun gear S2 formed integrally with the sun gear shaft 45, a carrier P2 coupled with the outer race 86 of the one-way clutch F2 and with the brake B3, and a ring gear R2 provided with a parking gear 85 on the outer periphery thereof and coupled with an intermediate portion 37 of the output shaft 36. The parking gear 85 is meshed with a parking pawl 84 to hold the output shaft 36 stationary when the parking position is selected by the shift lever of the automatic transmission.

Figure 4:
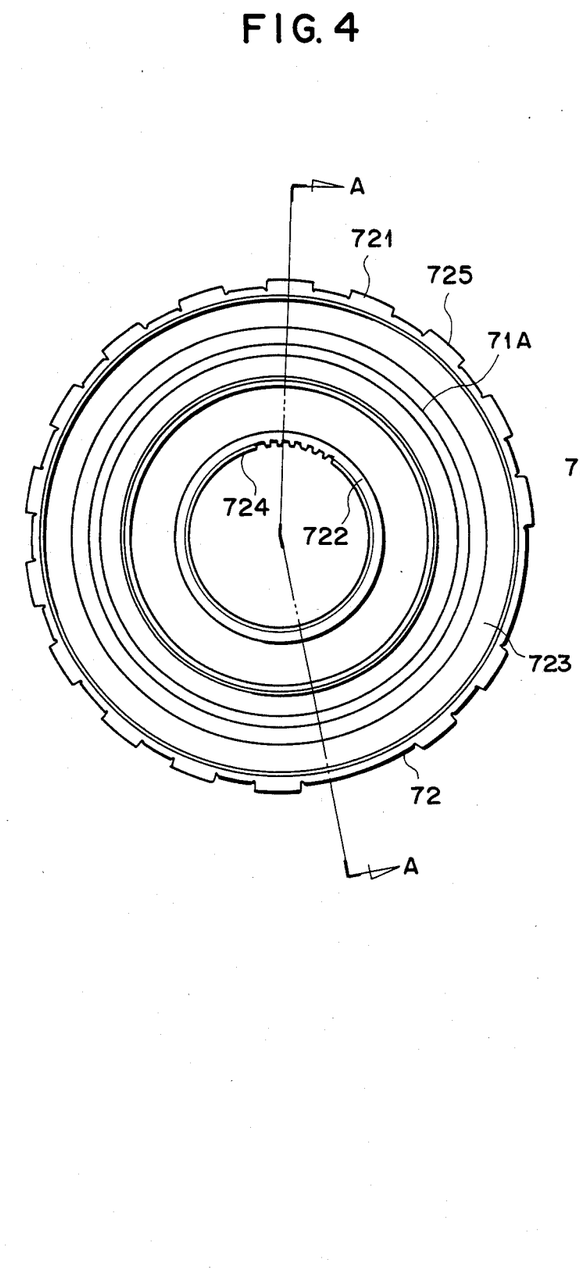
FIG. 4 is a schematic front view of a servo drum of the hydraulic servo according to the invention.
Figure 5:
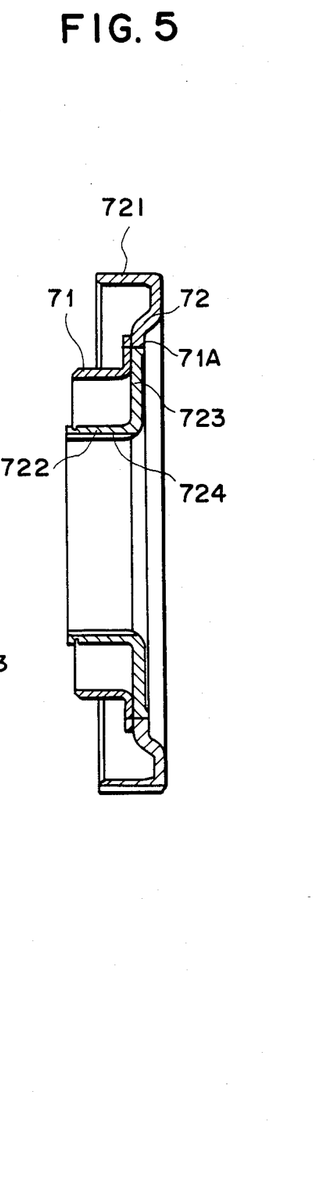
FIG. 5 is a schematic sectional view taken on line A—A of FIG. 4.
Figure 6:
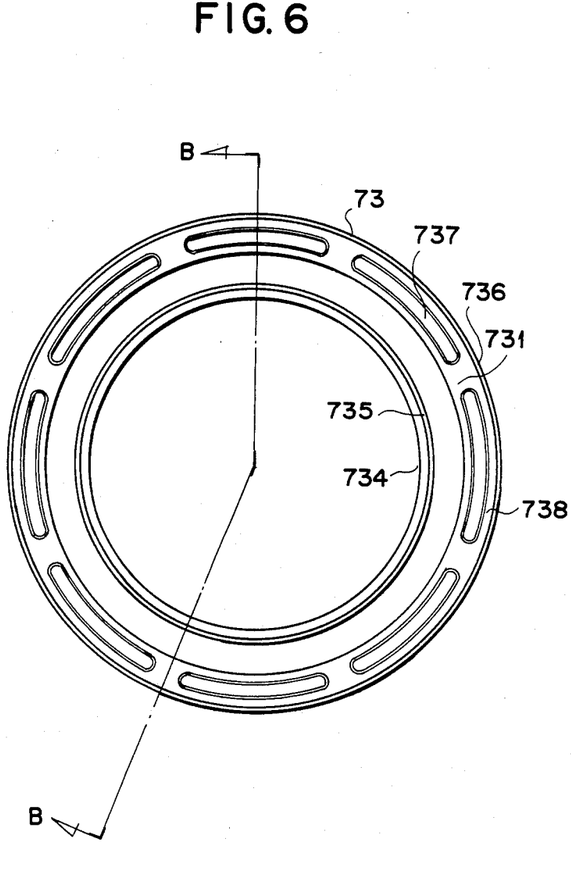
FIG. 6 is a schematic front view of a piston of the hydraulic servo according to the invention.
Figure 7:
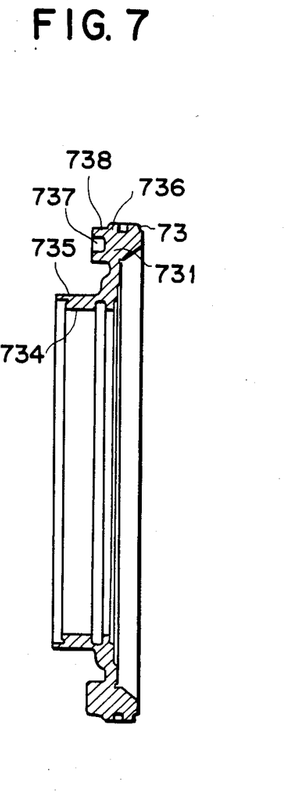
FIG. 7 is a schematic sectional view taken on line B—B of FIG. 6.
Figure 8:
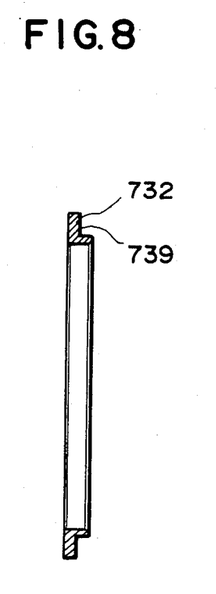
FIG. 8 is a schematic sectional view of an adaptor sleeve.
Figure 9:
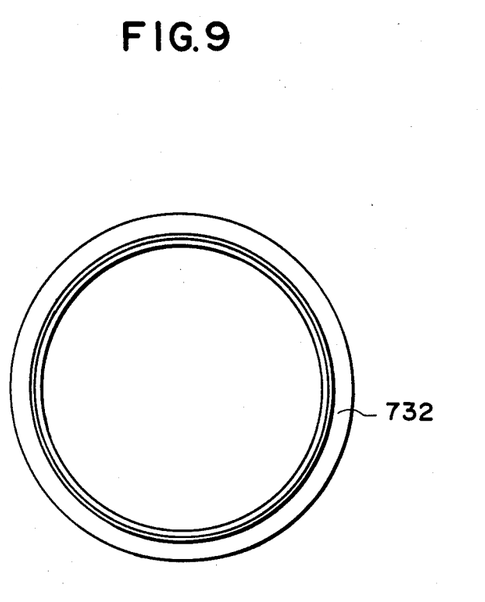
FIG. 9 is a schematic front view of the adaptor sleeve of FIG. 8.
Figure 10:
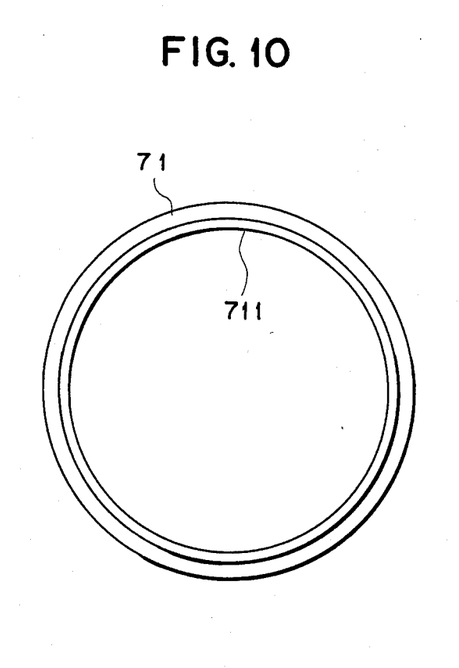
FIG. 10 is a schematic front view of an intermediate cylinder of the hydraulic servo according to the invention.
Figure 11:
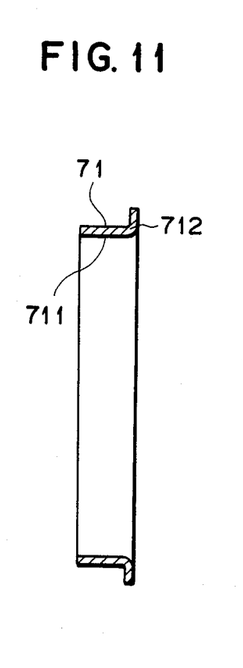
FIG. 11 is a sectional view of the intermediate cylinder of FIG. 10.
Figure 12:
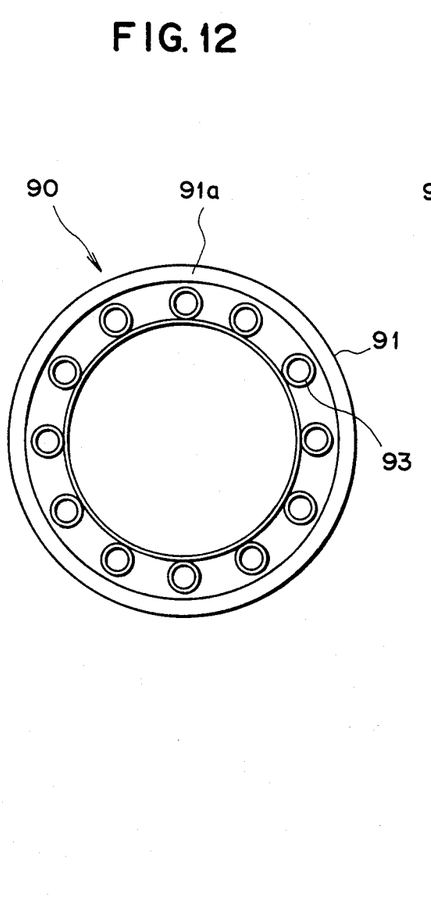
FIG. 12 is a front view of a connector ring and return springs employed in the hydraulic servo of the invention.
Figure 13:
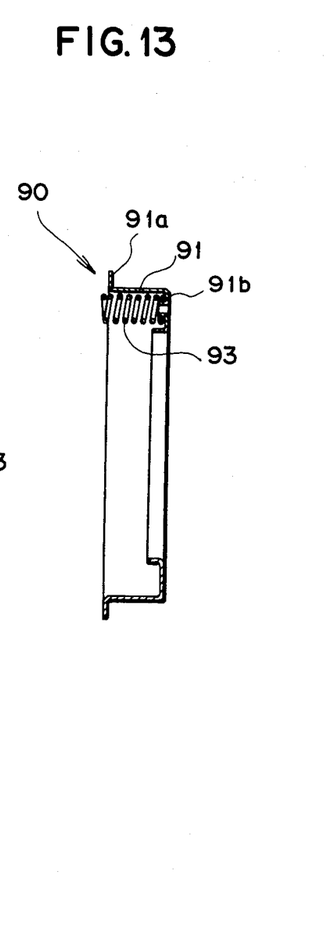
FIG. 13 is a schematic sectional view of the connector ring and return springs of FIG. 12.
Figure 14:
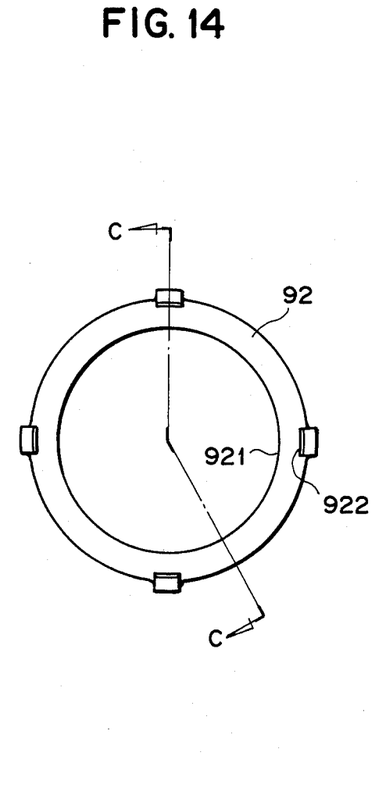
FIG. 14 is a schematic front view of a retainer employed in the hydraulic servo according to the invention.
Figure 15:
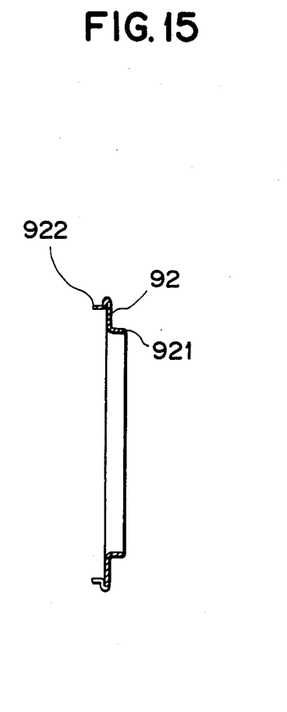
FIG. 15 is a schematic section of the retainer taken on line C—C of FIG. 14.

Referring to FIG. 3, provided in a surplus space 61 rearward of the connecting drum 60 on the outer side of the second planetary gear set 50 is an annular fourth servo drum 72, which is opened forwardly as shown also in FIGS. 4 and 5 and also serves as a reaction plate for return springs which will be described hereinlater. The servo drum 72 consists of outer and inner cylinders 721 and 722 and a side wall 723 connecting the outer and inner cylinders, and is formed in U-shape in section, with an inner spline 724 formed on its inner periphery by machining operation and an outer spline 725 formed on its outer periphery for engagement with the transmission case 130. The drum 72 is fixed to the transmission casd 130 in the rotational direction by the outer spline 725, and fixed in the axial direction by a snap ring 733 and a stepped portion 726 formed on the transmission case 130, supporting by the snap ring 733 the pressure which is imposed thereto at the time of engagement of the brake B3 on the rear side of the hydraulic servo. The hydraulic servo further includes: an intermediate cylinder 71 which is connected to the drum 72 at a welded portion 71A to prevent leakage of oil pressure of the hydraulic servo and formed into the shape shown by press-forming: a piston body 731 having, as shown also in FIGS. 6 and 7, a connecting member attached to one end face 735 on the inner peripheral side as will be described hereinlater, and forwardly opened holes 737 around outer periphery 736 of its one end portion 738; and an adapter sleeve 732 covering one end portion 738 of the piston 731 by a rear side surface 739 of an L-shaped wall portion (FIGS. 7 and 8). A piston 73 which improves the assembling of the snap ring 733, which fixes the fourth hydraulic servo drum 72 to the transmission case 130, is fitted between the fourth hydraulic servo drum 72 and the intermediate cylinder 71 which is projected from a predetermined position within the drum 72 to constitute the hydraulic servo B-2 for the brake B2, the intermediate cylinder 71 having a diameter corresponding to the optimum area of the piston 73.

The return biasing means 90 includes as shown in FIGS. 10 through 15: a connecting member 91 having one end 91a securely fixed to one end face 735 of the piston 73 on the inner peripheral side 735 and the other end 91b folded around the inner peripheral side of the intermediate cylinder 71 toward the other end 712 thereof; a retainer 92 having one end 921 thereof securely fixed to one end 727 of the inner cylinder 722 and one end 922 folded around and engaged with the outer periphery of the snap ring 94 which is fixed to one end of the inner cylinder 722; and return springs 93 interposed between the connecting member 91 and the retainer 92.

The transmission 300 includes a hydraulic control system 300, within a valve body 403 provided in an oil pan 401 which is fastened to the lower side of the transmission case 130 by bolts 402, thereby to supply the oil pressure selectively to the hydraulic servos of the respective friction coupling devices according to vehicle speed, extent of throttle opening or other operating conditions of the vehicle, releasing or engaging the clutches and brakes to establish four forward and one reverse speed ranges. Table 1 below shows by way of example the engaged and released states of the respective clutches and brakes in relation with the ranges to be established.

TABLE 1

| RANGES | | Clutches | | | Brakes | | | | OWC | | |
|---|---|---|---|---|---|---|---|---|---|---|---|
| | | $C_0$ | $C_1$ | $C_2$ | $B_0$ | $B_1$ | $B_2$ | $B_3$ | $F_0$ | $F_1$ | $F_2$ |
| P | | E | X | X | X | X | X | X | f | f | f |
| R | | E | X | E | X | X | X | E | f | f | f |
| N | | E | X | X | X | X | X | X | f | f | f |
| D | 1 | E | E | X | X | X | X | X | (L) | f | L |
| | 2 | E | E | X | X | X | E | X | (L) | L | f |
| | 3 | E | E | E | X | X | E | X | (L) | f | f |
| | 4 | X | E | E | E | X | E | X | f | f | f |
| S | 1 | E | E | X | X | X | X | X | (L) | f | L |
| | 2 | E | E | X | X | E | E | X | (L) | (L) | f |
| | 3 | E | E | E | X | X | E | X | (L) | f | f |
| | (3) | E | E | E | X | X | E | X | (L) | f | f |
| L | 1 | E | E | X | X | X | X | E | (L) | f | (L) |
| | 2 | E | E | X | X | E | E | X | (L) | (L) | f |
| | (1) | E | E | X | X | X | X | E | (L) | f | (L) |

In Table 1, the character "E" indicates the engaged state of the corresponding clutch,b rake or one-way clutch. The character "L" indicates that the corresponding one-way clutch is engaged only in engine-drive operation and not in engine-brake operation, while the mark "(L)" indicates that the corresponding one-way clutch is engaged in engine-drive operation though its engagement is not necessarily required since the power is transmitted through a parallel clutch or brake. The character "f" denotes that the corresponding one-way clutch is in free state. Further, the character "X" indicates the released state of the corresponding clutch or brake.

What is claimed is:

1. A hydraulic servo for an automatic transmission including a casing, said hydraulic servo comprising:

an annular drum of two-piece construction and having a first piece which includes a first cylinder splined to the casing, a second cylinder, and a side wall connecting said first and second cylinders, and a second piece which includes a third cylinder formed separately from said first piece and connected to said side wall at a suitable position between said first and second cylinders, said first and third cylinders defining a first cylindrical annular space therebetween and said second and third cylinders defining a second cylindrical annular space therebetween, said second annular space being radially inward of said first annular space;

a piston fitted within said first annular space, between said first and third cylinders, said piston having inner and outer cylindrical surfaces and sealing means for forming seals between said piston and said first and third cylinders on the interior of said first annular space, thereby defining the working area of said piston as being located entirely within said first annular space; and a return biasing means provided within said second annular space between said third and second cylinders; and including:

a connecting member having one end thereof securely fixed to said piston and joining said piston at a point axially aligned with said third cylinder, and a second end located within said second annular space;

retainer securely fixed to said second cylinder; and return springs located within said second annular space and disposed between said second end of said connecting member and said retainer.

2. The hydraulic servo of claim 1 wherein said third cylinder is welded to said side wall.

3. The hydraulic servo of claim 1 wherein said return springs are helical springs, each of said springs having one end fixed to said retainer and stationary relative to said drum and a another end fixed to said connecting member for movement in parallel with said piston.

* * * * *

UNITED STATES PATENT AND TRADEMARK OFFICE
CERTIFICATE OF CORRECTION

PATENT NO. : 4,753,132
DATED : June 28, 1988
INVENTOR(S) : SUMIYA et al

It is certified that error appears in the above-identified patent and that said Letters Patent is hereby corrected as shown below:

```
Col. 1, line 14, "iner" should read --inder--;

line 33, "autmatic" should read --automatic--.

Col. 3, line 4, "20" should read --10--;

line 5, "10" should read --20--.

Col. 4, line 26, "portionl" should read --portion--.

Col. 5, line 53, "casd" should read --case--.

Col. 6, line 56, "clutch,b rake" should read --clutch, brake--

Col. 8, line 11, before "retainer" insert --a--.
```

Signed and Sealed this

Eighth Day of November, 1988

Attest:

DONALD J. QUIGG

*Attesting Officer*      Commissioner of Patents and Trademarks